(12) United States Patent
Schultz

(10) Patent No.: US 12,656,610 B2
(45) Date of Patent: Jun. 16, 2026

(54) NEAR FOCUS CORRECTIVE AR GLASSES

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 555 days.

(21) Appl. No.: 17/297,915

(22) PCT Filed: Jan. 24, 2020

(86) PCT No.: PCT/US2020/014993
§ 371 (c)(1),
(2) Date: May 27, 2021

(87) PCT Pub. No.: WO2020/113245
PCT Pub. Date: Jun. 4, 2020

(65) Prior Publication Data
US 2022/0019080 A1 Jan. 20, 2022

Related U.S. Application Data

(60) Provisional application No. 62/771,934, filed on Nov. 27, 2018.

(51) Int. Cl.
*G02B 27/01* (2006.01)
*F21V 8/00* (2006.01)
*G02C 7/02* (2006.01)

(52) U.S. Cl.
CPC ....... *G02B 27/0172* (2013.01); *G02B 6/0023* (2013.01); *G02B 6/005* (2013.01); *G02C 7/02* (2013.01); *G02B 2027/011* (2013.01)

(58) Field of Classification Search
CPC .............. G02B 27/017; G02B 27/0172; G02B 2027/0174; G02B 2027/0178; G02B 2027/011
See application file for complete search history.

(56) References Cited

U.S. PATENT DOCUMENTS 5,654,828 A 8/1997 Togino et al.
6,219,186 B1 4/2001 Hebert
(Continued)

FOREIGN PATENT DOCUMENTS

CN 206020813 U 3/2017
CN 207440426 U 6/2018
(Continued)

OTHER PUBLICATIONS

Komatsu, Akira (Seiko Epson Corp.), Development of Smart Glasses, Optronics, JP, Apr. 10, 2016, No. 412, 93-98.
(Continued)

*Primary Examiner* — Bao-Luan Q Le
(74) *Attorney, Agent, or Firm* — Harter Secrest & Emery LLP; Jacob D. Merrill, Esq.

(57) ABSTRACT

A head-mounted display for an augmented reality application includes an image light guide arranged within the aperture of an eye rim section of the head-mounted display for directing angularly related image-bearing light beams encoding a virtual object toward an eyebox for the viewing the virtual object at a hyperfocal to near infinite focusing distance to the eyebox. A negative-power optic between one side of the image light guide and the eyebox diverges the image-bearing beams in advance of the eyebox for viewing the virtual object at a closer distance to the eyebox that is less than the hyperfocal distance. A positive-power optic on an opposite side of the image light guide compensates for the negative-power of the negative-power optic for viewing a real-world object at its actual distance to the eyebox. A corrective optic located between the image light guide and the eyebox reduces the viewer's aberrations for viewing of both the real-world object and the virtual object.

23 Claims, 13 Drawing Sheets

(56) References Cited

U.S. PATENT DOCUMENTS

| | | | | |
|---|---|---|---|---|
| 6,829,095 | B2 * | 12/2004 | Amitai | G02B 6/0018 |
| | | | | 359/636 |
| 8,248,458 | B2 | 8/2012 | Schowengerdt et al. | |
| 8,988,463 | B2 | 3/2015 | Stone Perez et al. | |
| 9,057,826 | B2 * | 6/2015 | Gupta | G02C 7/086 |
| 9,779,643 | B2 * | 10/2017 | Bohn | G09G 3/001 |
| 10,007,115 | B2 * | 6/2018 | Greenhalgh | G02B 27/0081 |
| 10,747,309 | B2 * | 8/2020 | Akkaya | G06F 3/013 |
| 10,859,837 | B2 * | 12/2020 | Adema | G02B 27/0081 |
| 10,948,801 | B1 * | 3/2021 | Lu | G02C 7/083 |
| 11,187,923 | B2 * | 11/2021 | Dominguez | G02C 7/10 |
| 11,287,663 | B2 * | 3/2022 | Lo | G02B 27/288 |
| 11,994,752 | B2 * | 5/2024 | Lim | G02C 1/02 |
| 2003/0165017 | A1 * | 9/2003 | Amitai | G02B 27/0081 |
| | | | | 359/636 |
| 2013/0208003 | A1 * | 8/2013 | Bohn | G09G 3/342 |
| | | | | 445/24 |
| 2014/0211146 | A1 * | 7/2014 | Gupta | G02C 7/086 |
| | | | | 351/158 |
| 2014/0254024 | A1 | 9/2014 | Noriaki et al. | |
| 2017/0001032 | A1 | 1/2017 | Samec et al. | |
| 2017/0045742 | A1 * | 2/2017 | Greenhalgh | G02B 27/0081 |
| 2018/0052320 | A1 | 2/2018 | Curtis et al. | |
| 2018/0067315 | A1 * | 3/2018 | Amitai | G02B 6/0035 |
| 2018/0074331 | A1 | 3/2018 | Ouderkirk et al. | |
| 2019/0187490 | A1 * | 6/2019 | Dominguez | G02B 27/0176 |
| 2019/0235239 | A1 | 8/2019 | Ho et al. | |
| 2019/0346918 | A1 * | 11/2019 | Akkaya | G02B 27/0075 |
| 2020/0096772 | A1 * | 3/2020 | Adema | G02B 6/0016 |
| 2020/0124853 | A1 * | 4/2020 | Lo | G02B 27/106 |
| 2021/0157167 | A1 * | 5/2021 | Lim | G02C 5/008 |

FOREIGN PATENT DOCUMENTS

| | | |
|---|---|---|
| CN | 209417423 | 9/2019 |
| JP | 2004-021078 A | 1/2004 |
| JP | 2020-514830 A | 5/2020 |
| WO | 2018/060557 A1 | 4/2018 |
| WO | 2018175546 A1 | 9/2018 |

OTHER PUBLICATIONS

United States Patent & Trademark Office (ISA/US), International Search Report and Written Opinion in International Application No. PCT/US/2020/014993, dated Apr. 23, 2020.

* cited by examiner

NEAR FOCUS CORRECTIVE AR GLASSES

TECHNICAL FIELD

The present disclosure relates to augmented reality systems that include near-eye displays operable to display virtual images superimposed on real-world views through the displays.

BACKGROUND

Head-mounted displays (HMDs) increasingly take the form of conventional eyeglasses with less obtrusive optics for displaying virtual image content along with less obstructed views of the ambient environment. Image generators can be supported along eyeglass temples and substantially transparent image light guides convey the generated images to the wearer's eyes as virtual images that are projected into the wearer's real-world view that is visible through the image light guides.

The image content can be conveyed along the image light guides as a set of angularly related beams, where the relative angular orientation of each beam in two angular dimensions corresponds to a different position (e.g., pixel) within the generated image. Typically, the beams themselves are collimated as if corresponding to points of light at far distance located at a unique angular position within the field of view. Thus, when the collimated beams are directed into overlapping positions within a common eyebox, the wearer's eye views the generated images from the eyebox as virtual images located at a distance approaching infinity. However, real-world objects of interest to the wearer may be located much closer and require some noticeable eye accommodation to bring into focus. Viewing virtual objects and real-world objects requiring different focusing accommodations within the same scene can cause eye strain.

Vision problems of the wearer's caused by refractive errors such as nearsightedness (myopia), farsightedness (hyperopia), and astigmatism can also present challenges to low profile HMDs resembling conventional eyeglasses. If a wearer's eyeglasses containing corrective lenses must be removed to accommodate a low-profile HMD, the wearer's view of both real-world and virtual objects through the HMDs can be compromised.

SUMMARY

Embodiments of this disclosure feature improvements to HMDs to manage either or both focusing discrepancies between real-world and virtual objects presented to the wearers of HMDs and vision problems affecting the focusing capabilities of the wearers themselves. The wearer's eyes are required to convert virtual images to real images, and the disclosure provides for reducing demands on the wearer's eyes for viewing virtual objects together with real-world objects within the same field of view.

An HMD in accordance with this disclosure has an eye rim section with an aperture through which a wearer can view a real-world object within the ambient environment. While many HMDs are arranged to support binocular vision with an eye rim section provided for each eye, various improvements are described with respect to a single eye rim section for supporting monocular vision with the understanding that a second eye rim section in a symmetric arrangement could be used for supporting binocular or stereoscopic vision.

An image light guide arranged within the aperture of the eye rim section of the referenced head-mounted display includes a transmissive planar waveguide having plane-parallel inner and outer surfaces, an in-coupling optic, and an out-coupling optic. The in-coupling optic directs angularly related image-bearing light beams encoding a virtual object into the waveguide for propagation by internal reflection from the parallel inner and outer surfaces. The out-coupling optic directs the propagating image-bearing light beams from the waveguide toward an eyebox for viewing the virtual object at a first focusing distance from the eyebox. A multifunction optic formed as a single optical element located within the aperture between the inner surface of the waveguide and the eyebox provides both: (a) a negative optical power contribution for diverging the image-bearing beams in advance of the eyebox for viewing the virtual object at a closer second focusing distance from the eyebox, and (b) a corrective optical contribution for reducing a viewer's optical aberrations associated with viewing both the real-world object and the virtual object at the closer second focusing distance. A positive-power optic located within the aperture between the outer surface of the waveguide and the ambient environment compensates for the negative optical power contribution of the multifunction optic without compensating for the corrective optical contribution of the multifunction optic for viewing the real-world object at its actual distance from the eyebox with corrected vision.

The first focusing distance is preferably a hyperfocal to near infinite distance and the closer second focusing distance is preferably less than the hyperfocal distance. For example, the closer second focusing distance can be between 1.5 meters and 4 meters or between 0.05 meters and 1.5 meters. The corrective optical contribution is preferably set for reducing the viewer's optical aberrations at the closer second focusing distance.

The multifunction optic can be a first of a plurality of multifunction optics, and the first multifunction optic can be removable and replaceable with a second of the multifunction optics to adapt the display to a different optical prescription. The positive-power optic can also be a first of a plurality of positive-power optics. The first multifunction optic and the first positive-power optic can be collectively removable and replaceable with a second of the multifunction optics and a second of the positive-power optics for changing the closer second focusing distance to a different third focusing distance. The second multifunction optic can also provide a corrective optical contribution to reduce the viewer's optical aberrations at the different third focusing distance. Both the multifunction optics and the positive-power optics can each be formed as a single refractive lens element.

A transmissive protective outer cover can be located within the aperture between the positive-power optic and the ambient environment. Alternatively, the positive-power optic can be formed as a lens having a convex outer surface facing the ambient environment and treated with a protective coating.

An augmented reality virtual image display system in accordance with this disclosure provides for managing a viewer's view of a virtual object and a real-world object within a common field of view, particularly where the real-world object is intended to be viewed as less than a hyperfocal distance requiring significant eye accommodation. An image light guide directs angularly related image-bearing light beams encoding the virtual object toward an eyebox for the viewing the virtual object at a first focusing distance from the eyebox. A multifunction optic formed as a single optical element located between the inner side of the image light guide and the eyebox provides both: (a) a negative optical power contribution for diverging the image-bearing beams in advance of the eyebox for viewing the virtual object at a closer second focusing distance from the eyebox, and (b) a corrective optical contribution for reducing a viewer's optical aberrations associated with viewing of both the real-world object and the virtual object at the closer second focusing distance. A positive-power optic on the outer side of the image light guide compensates for the negative optical power contribution of the multifunction optic without compensating for the corrective optical contribution of the multifunction optic for viewing the real-world object at its actual distance from the eyebox with corrected vision.

The multifunction optic is preferably a single refractive lens element. The first focusing distance is preferably a hyperfocal to near infinite distance and the closer second focusing distance is less than the hyperfocal distance, such as between 1.5 meters and 4 meters or between 0.05 meters and 1.5 meters. The corrective optical contribution is preferably set for reducing the viewer's optical aberrations at the closer second focusing distance.

The multifunction optic can be a first of a plurality of multifunction optics, and the first multifunction optic can be removable and replaceable with a second of the multifunction optics to adapt the display system to a different optical prescription. The negative-power contribution of the second multifunction optic can be the same as the negative power contribution of the first multifunction optic, but the corrective optical contribution of the second multifunction optic is different from the corrective optical contribution of the first multifunction optic.

The multifunction optic can be a first of a plurality of multifunction optics and the positive-power optic can be a first of a plurality of positive-power optics. As such, the first multifunction optic and the first positive-power optic are preferably collectively removable and replaceable with a second of the multifunction optics and a second of the positive-power optics for changing the closer second focusing distance to a different third focusing distance. The second multifunction optic preferably provides a corrective optical contribution to reduce the viewer's optical aberrations at the different third focusing distance.

A transmissive protective outer cover can be located between the positive-power optic and the ambient environment from which the real-world object is viewed. Alternatively, the positive-power optic can be arranged as a lens having a convex outer surface that faces the ambient environment and is treated with a protective coating.

The image light guide can include a transmissive planar waveguide having plane-parallel inner and outer surfaces, an in-coupling optic for directing the angularly related image-bearing light beams into the waveguide from an image source for propagation by internal reflection from the inner and outer surfaces, and an out-coupling optic for directing the propagating image-bearing light beams from the waveguide toward the eyebox.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
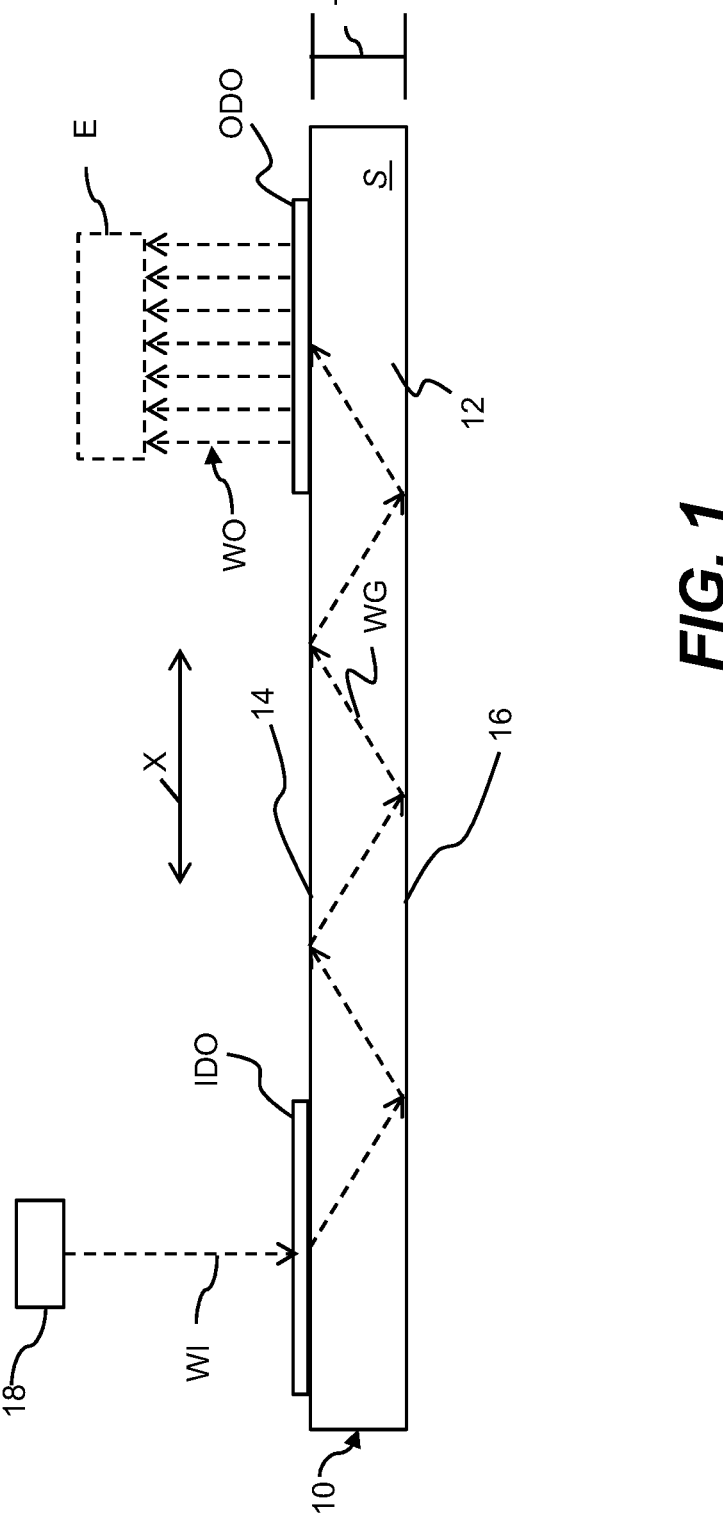
FIG. 1 is a top edge view of an image light guide of a virtual image display system showing the propagation of light from an image source along the image light guide to an eyebox within which the virtual image can be viewed according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 is a schematic diagram showing a simplified cross-sectional view of one conventional configuration of an image light guide 10 comprising a planar waveguide 12, an in-coupling diffractive optic IDO, and an out-coupling diffractive optic ODO. The planar waveguide 12 includes a transparent substrate S, which can be made of optical glass or plastic, with plane-parallel inner and outer surfaces 14 and 16. In this example, the in-coupling diffractive optic IDO is shown as a transmissive type diffraction grating arranged on the inner surface 14 of the planar waveguide 12. However, in-coupling diffractive optic IDO could alternately be a reflective type diffraction grating or other type of diffractive optic, such as a volume hologram or other holographic diffraction element, that diffracts an incoming image-bearing light WI into the planar waveguide 12. The in-coupling diffractive optic IDO can be located on the inner or outer surface 14 or 16 of the planar waveguide 12 and can be of a transmissive or reflective type in a combination that depends upon the direction from which the image-bearing light WI approaches the planar waveguide 12.

When used as a part of a virtual image display system, the in-coupling diffractive optic IDO couples the image-bearing light WI from a real, virtual or hybrid image source 18 into the substrate S of the planar waveguide 12. Any real image or image dimension formed by the image source 18 is first converted, e.g. converged toward a focus, into an array of overlapping angularly related beams encoding the different positions within a virtual image for presentation to the in-coupling diffractive optic IDO. Typically, the rays within each bundle forming one of the angularly related beams extend in parallel, but the angularly related beams are relatively inclined to each other through angles that can be defined in two angular dimensions corresponding to linear dimensions of the image.

The image-bearing light WI is diffracted (generally through a first diffraction order) and thereby redirected by in-coupling diffractive optic IDO into the planar waveguide 12 as image-bearing light WG for further propagation along a length dimension X of the planar waveguide 12 by total internal reflection (TIR) from the plane parallel inner and outer surfaces 14 and 16. Although diffracted into a different combination of angularly related beams in keeping with the boundaries set by TIR, the image-bearing light WG preserves the image information in an angularly encoded form that is derivable from the parameters of the in-coupling diffractive optic IDO. The out-coupling diffractive optic ODO receives the encoded image-bearing light WG and diffracts (also generally through a first diffraction order) the image-bearing light WG out of the planar waveguide 12 as the image-bearing light WO toward a nearby region of space referred to as an eyebox E, within with the transmitted virtual image can be seen by a viewer's eye. The out-coupling diffractive optic ODO can be designed symmetrically with respect to the in-coupling diffractive optic IDO to restore the original angular relationships of the image-bearing light WI among outputted angularly related beams of the image-bearing light WO. In addition, the out-coupling diffractive optic ODO can modify the original field points' positional angular relationships producing an output virtual image at a finite focusing distance.

However, to increase one dimension of overlap among the angularly related beams populating the eyebox E defining the size of the region within which the virtual image can be seen, the out-coupling diffractive optic ODO is arranged together with a limited thickness T of the planar waveguide 12 to encounter the image-bearing light WG multiple times and to diffract only a portion of the image-bearing light WG upon each encounter. The multiple encounters along the length of the out-coupling diffractive optic ODO have the effect of enlarging one dimension of each of the angularly related beams of the image-bearing light WO thereby expanding one dimension of the eyebox E within which the beams overlap. The expanded eyebox E decreases sensitivity to the position of a viewer's eye for viewing the virtual image.

The out-coupling diffractive optic ODO is shown as a transmissive type diffraction grating arranged on the inner surface 14 of the planar waveguide 12. However, like the in-coupling diffractive optic IDO, the out-coupling diffractive optic ODO can be located on the inner or outer surface 14 or 16 of the planar waveguide 12 and be of a transmissive or reflective type in a combination that depends upon the direction through which the image-bearing light WG is intended to exit the planar waveguide 12. In addition, the out-coupling diffractive optic could be formed as another type of diffractive optic, such as a volume hologram or other holographic diffraction element, that diffracts propagating image-bearing light WG from the planar waveguide 12 as the image-bearing light WO propagating toward the eyebox E.

Figure 2:
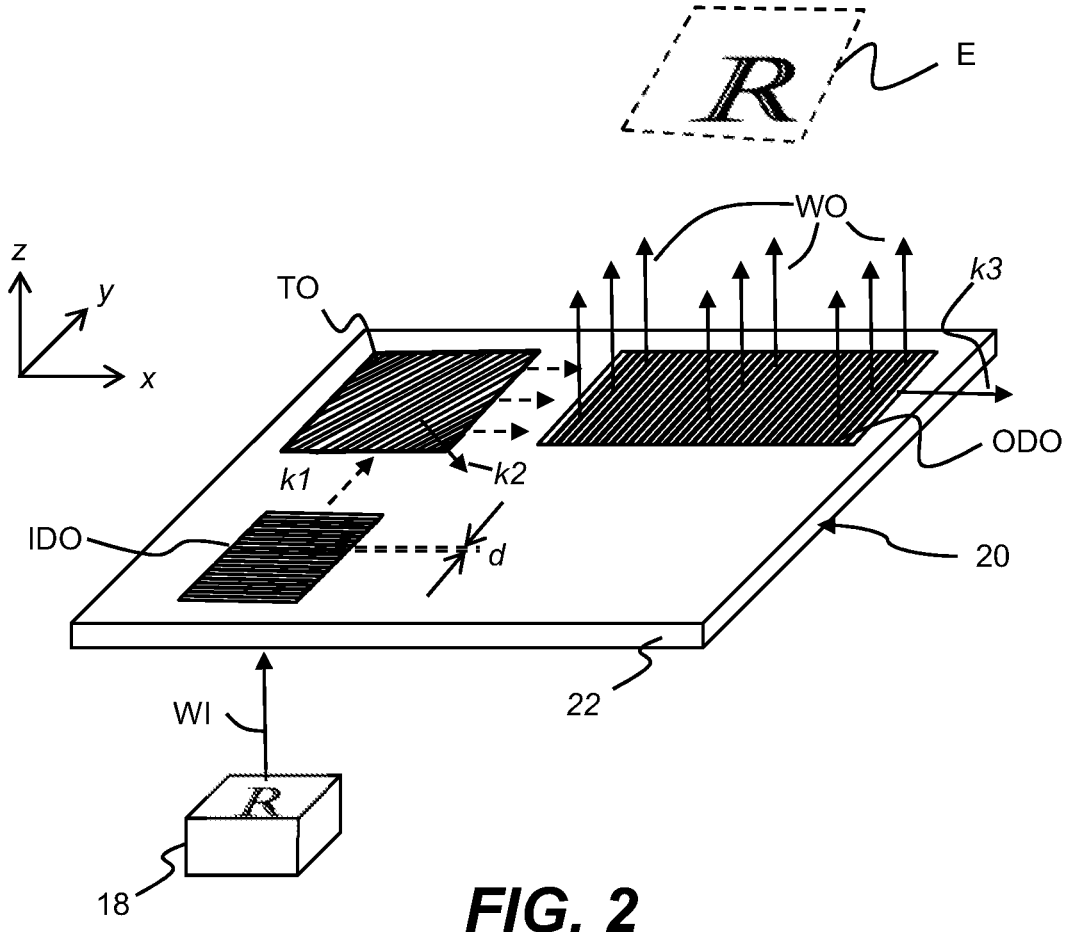
FIG. 2 is a perspective view of an image light guide of a virtual image display system including an in-coupling diffractive optic, an intermediate turning diffractive optic, and out-coupling diffractive optic for managing the propagation of image-bearing light beams according to an embodiment of the present disclosure.

The perspective view of FIG. 2 shows an image light guide 20 that is arranged for expanding the eyebox E in two dimensions, i.e., along both x- and y-axes of the intended image. To achieve a second dimension of beam expansion, the in-coupling diffractive optic IDO is oriented to diffract the image-bearing light WG about a grating vector k1 along planar waveguide 22 toward an intermediate turning optic TO, whose grating vector k2 is oriented to diffract the image-bearing light WG in a reflective mode along the planar waveguide 22 toward the out-coupling diffractive optic ODO. Only a portion of the image-bearing light WG is diffracted by each of multiple encounters with intermediate turning optic TO thereby laterally expanding each of the angularly related beams of the image-bearing light WG approaching the out-coupling diffractive optic ODO. The intermediate turning optic TO redirects the image-bearing light WG into an at least approximate alignment with a grating vector k3 of the out-coupling diffractive optic ODO for longitudinally expanding the angularly related beams of the image-bearing light WG in a second dimension before exiting the planar waveguide 22 as the image-bearing light WO. Grating vectors, such as the depicted grating vectors k1, k2, and k3, extend within a parallel plane of the planar waveguide 12 in respective directions that are normal to the diffractive features (e.g., grooves, lines, or rulings) of the diffractive optics and have respective magnitudes inverse to the period or pitch d (i.e., the on-center distance between the diffractive features) of the diffractive optics IDO, TO, and ODO.

In the image light guide 20 of FIG. 2, in-coupling diffractive optic IDO receives the incoming image-bearing light WI containing a set of angularly related beams corresponding to individual pixels or equivalent locations within an image generated by the image source 18, such as a projector. A full range of angularly encoded beams for producing a virtual image can be generated by a real display together with focusing optics, by a beam scanner for more directly setting the angles of the beams, or by a combination such as a one-dimensional real display used with a scanner. The image light guide 20 outputs an expanded set of angularly related beams in two dimensions of the image by providing multiple encounters of the image-bearing light WG with both the intermediate turning optic TO and the out-coupling diffractive optic ODO in different orientations. In the depicted orientation of the planar waveguide 22, the intermediate turning optic TO provides beam expansion in the y-axis direction, and the out-coupling diffractive optic ODO provides a similar beam expansion in the x-axis direction. The relative orientations and respective periods d of the diffractive features of the in-coupling, intermediate turning, and out-coupling diffractive optics IDO, TO, and ODO provide for beam expansion in two dimensions while preserving the intended relationships among the angularly related beams of the image-bearing light WI that are output from the image light guide 20 as the image-bearing light WO.

That is, while the image-bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The intermediate turning optic TO, located in an intermediate position between the in-coupling and out-coupling diffractive optics IDO and ODO, can be arranged so that it does not induce significant changes to the encoding of the image-bearing light WG. As such, the out-coupling diffractive optic ODO can be arranged in a symmetric fashion with respect to the in-coupling diffractive optic IDO, e.g., including diffractive features sharing the same period. Similarly, the period of the intermediate turning optic TO can also match the common period of the in-coupling and out-coupling diffractive optics IDO and ODO. Although the grating vector k2 of the intermediate turning optic TO is shown oriented at 45 degrees with respect to the other grating vectors, which remains a possible orientation, the grating vector k2 of the intermediate turning optic TO can be oriented at 60 degrees to the grating vectors k1 and k3 of the in-coupling and out-coupling diffractive optics IDO and ODO in such a way that the image-bearing light WG is turned 120 degrees. By orienting the grating vector k2 of the intermediate turning optic TO at 60 degrees with respect to the grating vectors k1 and k3 of the in-coupling and out-coupling diffractive optics IDO and ODO, the grating vectors k1 and k3 of the in-coupling and out-coupling diffractive optics IDO and ODO are also oriented at 60 degrees with respect to each other. Basing the grating vector magnitudes on the common pitch shared by the in-coupling, intermediate turning, and out-coupling diffractive optics IDO, TO, and ODO, the three grating vectors k1, k2, and k3 (as directed line segments) form an equilateral triangle, and sum to a zero vector magnitude, which avoids asymmetric effects that could introduce unwanted aberrations including chromatic dispersion. Such asymmetric effects can also be avoided by grating vectors k1, k2, and k3 that have unequal magnitudes in relative orientations at which the three grating vectors k1, k2, and k3 sum to a zero vector magnitude.

In a broader sense, the image-bearing light WI that is directed into the planar waveguide 22 is effectively encoded by the in-coupling optic, whether the in-coupling optic uses gratings, holograms, prisms, mirrors, or some other mechanism. Any reflection, refraction, and/or diffraction of light that takes place at the input must be correspondingly decoded by the output to re-form the virtual image that is presented to the viewer. Whether any symmetries are maintained or not among the intermediate turning optic TO and the in-coupling and out-coupling diffractive optics IDO and ODO or whether or not any change to the encoding of the angularly related beams of the image-bearing light WI takes place along the planar waveguide 12, the intermediate turning optic TO and the in-coupling and out-coupling diffractive optics IDO and ODO can be related so that the image-bearing light WO that is output from the planar waveguide 22 preserves or otherwise maintains the original or desired form of the image-bearing light WI for producing the intended virtual image.

The letter "R" represents the orientation of the virtual image that is visible to the viewer whose eye is in the eyebox E. As shown, the orientation of the letter "R" in the represented virtual image matches the orientation of the letter "R" as encoded by the image-bearing light WI. A change in the rotation about the z axis or angular orientation of incoming image-bearing light WI with respect to the x-y plane causes a corresponding symmetric change in rotation or angular orientation of outgoing light from out-coupling diffractive optic (ODO). From the aspect of image orientation, the intermediate turning optic TO simply acts as a type of optical relay, providing expansion of the angularly encoded beams of the image-bearing light WG along one axis (e.g., along the y axis) of the image. Out-coupling diffractive optic ODO further expands the angularly encoded beams of the image-bearing light WG along another axis (e.g., along the x axis) of the image while maintaining the original orientation of the virtual image encoded by the image-bearing light WI. The intermediate turning optic TO is typically a slanted or square grating or, alternately, can be a blazed grating and is typically arranged on one of the plane parallel inner and outer surfaces of the planar waveguide 22.

Together, the in-coupling, turning, and out-coupling diffractive optics IDO, TO, and ODO preferably preserve the angular relationships among beams of different wavelengths defining a virtual image upon conveyance by an image light guide 20 from an offset position to a near-eye position of the viewer. While doing so, the in-coupling, turning, and out-coupling diffractive optics IDO, TO, and ODO can be relatively positioned and oriented in different ways to control the overall shape of the planar waveguide 22 as well as the overall orientations at which the angularly related beams can be directed into and out of the planar waveguide 22.

The image light guides 10 and 20 as described above are presented as examples of image light guides that are suitable for use in head-mounted displays (HMDs) designed for augmented reality (AR) applications in which virtual image content is superimposed on a real-world view as seen through the transparent planar waveguides 12 or 22. Although the virtual image display systems are depicted with single planar waveguides, the display systems may also comprise multiple planar waveguides in a stacked format for separately conveying images in different colors or different portions of the images. In more general sense, the image light guides contemplated herein through which virtual images can be directed to a wearer's eye can take various forms and can include a variety of ways for in-coupling and out-coupling light into and out of a waveguide while still supporting views of the ambient environment through the waveguide. That is, both the out-coupling optic and the waveguide itself should be constructed to not unduly interfere with the wearer's view of the ambient environment through the waveguide. Both virtual objects as conveyed by the image light guide and real-world objects that are seen through the image light guide should be clearly visible to the wearer to support further interactions of the wearer with the ambient environment such as may be informed by the superimposed virtual content.

Figure 3:
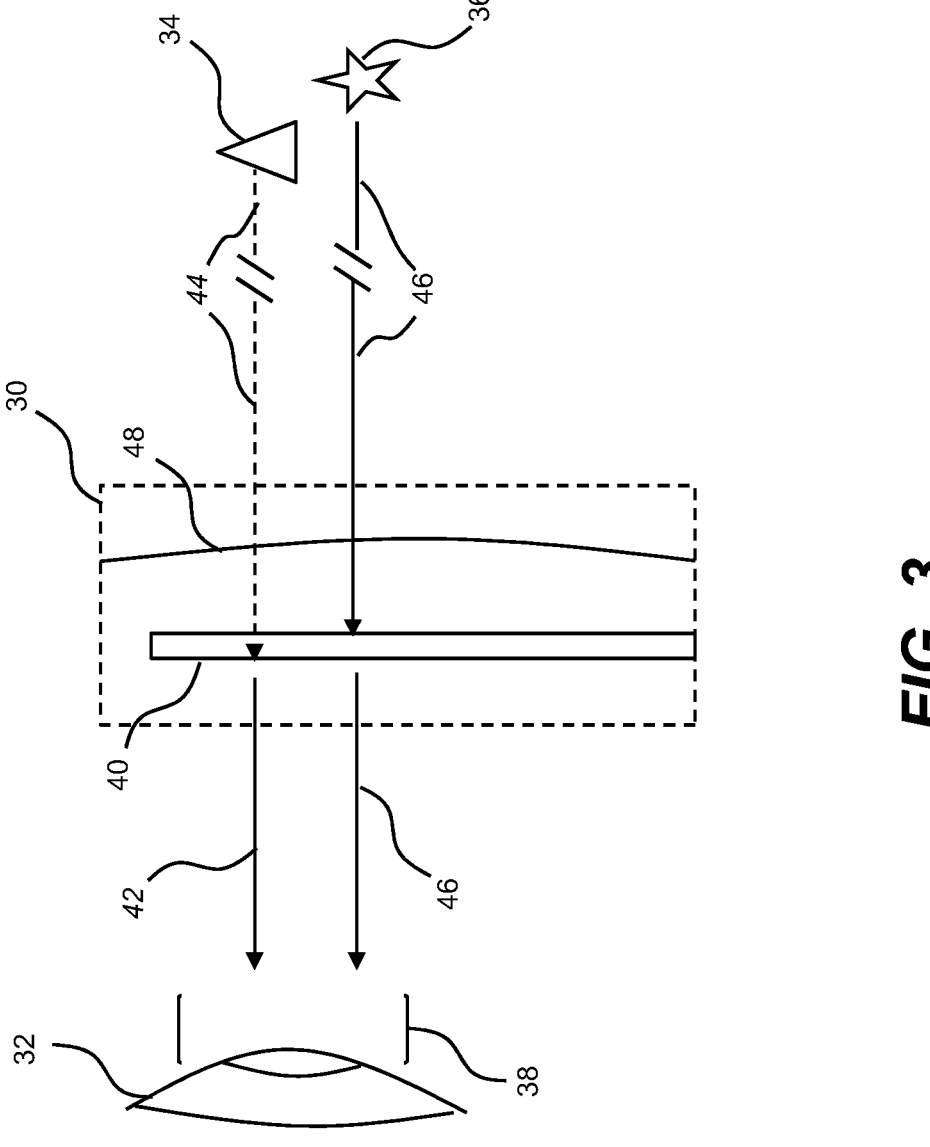
FIG. 3 is a schematic top view of an eye rim section of an HMD arranged for and augmented reality application containing and outer protective cover and an image light guide for supporting views of real-world and virtual objects within the same field of view according to an embodiment of the present disclosure.

FIG. 3 is a schematic depiction of an eye rim section 30 of an HMD arranged for an augmented reality application and containing an image light guide 40, such as the previously described image light guides 10 and 20, for conveying virtual images to a wearer's eye 32 while providing a real-world view through the image light guide 40. In this way, virtual objects 34 can be presented to the wearer's eye 32 among real-world objects 36 that are visible through the image light guide 40. The image-bearing light beams generated from the image source (not shown) typically propagate along and from the image light guide as respective collimated beams that are angularly related to one another for forming virtual images. As a part of a virtual image display system as described above, the image-bearing light beams 42 emitted from the image light guide 40 appear as if originating from virtual objects 34 via the virtual image-bearing light beams 44 at a hyperfocal to near infinite focusing distance, e.g. from 6 to 7 meters to near infinity from wearer's eye 32. In this context, the pupil of the wearer's eye 32 is located in an eyebox 38 within which the virtual images can be seen by the wearer, and the hyperfocal distance sets the shortest object distance to a normal or corrected eye beyond which objects can be viewed without need for accommodation (i.e., a change in the focal length of the eye).

In contrast to the image-bearing light beams 42 emitted directly into the wearer's eye 32, light beams 46 from the real-world objects 36 transmit through both a transmissive protective outer cover 48 and the image light guide 40 before reaching the wearer's eye 32. Thus, the transmissive protective outer cover 48 can provide filtering or other optical functions that affect the wearer's view of the real-world objects 36 without similarly affecting the wearer's view of the virtual objects 34.

Figure 4:
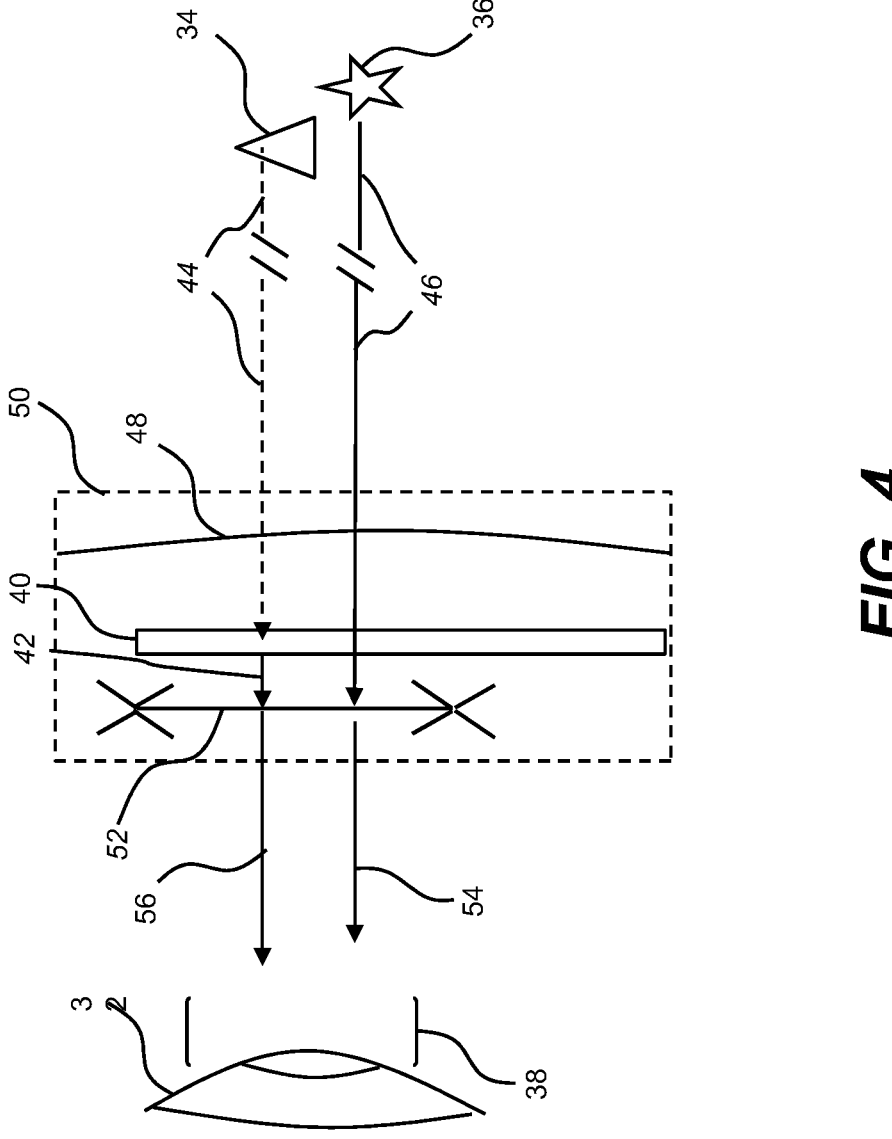
FIG. 4 is a schematic top view of an eye rim section of an HMD based on the eye rim section of FIG. 3 and adding a corrective optic.

FIG. 4 is a schematic depiction of an eye rim section 50 of an HMD having both an image light guide 40 as a part of a virtual image display system and a transmissive protective outer cover 48 like in the eye rim section 30. Some wearers of the HMD may have difficulty viewing distant objects in focus, a condition referred to as near-sightedness or myopia. The condition affects the wearer's ability to clearly focus both real objects beyond a given distance from the wearer and virtual objects that appear to be located beyond the given distance from the wearer.

A replaceable and customizable corrective optic 52 is positioned between the wearer's eye 32 and the one or more waveguides of the image light guide 40. The corrective optic 52, which can exploit mechanisms of refraction or diffraction for reformatting transmitted light, is removably mounted within the eye rim section 50 of the HMD for providing a desired optical correction (e.g., negative focusing power), such as may be estimated by an optical prescription, for normalizing the wearer's long-distance vision.

The light beams 46 from the distant real-world objects 36 transmit through both a transmissive protective outer cover 48 and the image light guide 40 before encountering the corrective optic 52 having a desired amount of optical power that reorients or otherwise rearranges the light beams 46 into the light beams 54 so that the wearer's eye 32 can more clearly focus the real-world objects 36 without significant aberrations. Similarly, the image-bearing light beams 42 emitted from the image light guide 40, which mimics virtual image-bearing light beams 44 from the distant virtual objects 34, encounter the corrective optic 52 that reorients or otherwise rearranges the light image-bearing light beams 42 into the image-bearing light beams 56 so that the wearer's eye 32 can more clearly focus the distant virtual objects 34 without significant aberrations. The corrective optic 52 is preferably both attachable to and detachable from eye rim section 50. While the corrective optic 52 is especially suitable for correcting nearsightedness, other types of systematic aberrations including astigmatism can also be corrected. For example, the corrective optic can be arranged as a multifocal or bifocal optic for correcting aberrations at different distances.

Figure 5:
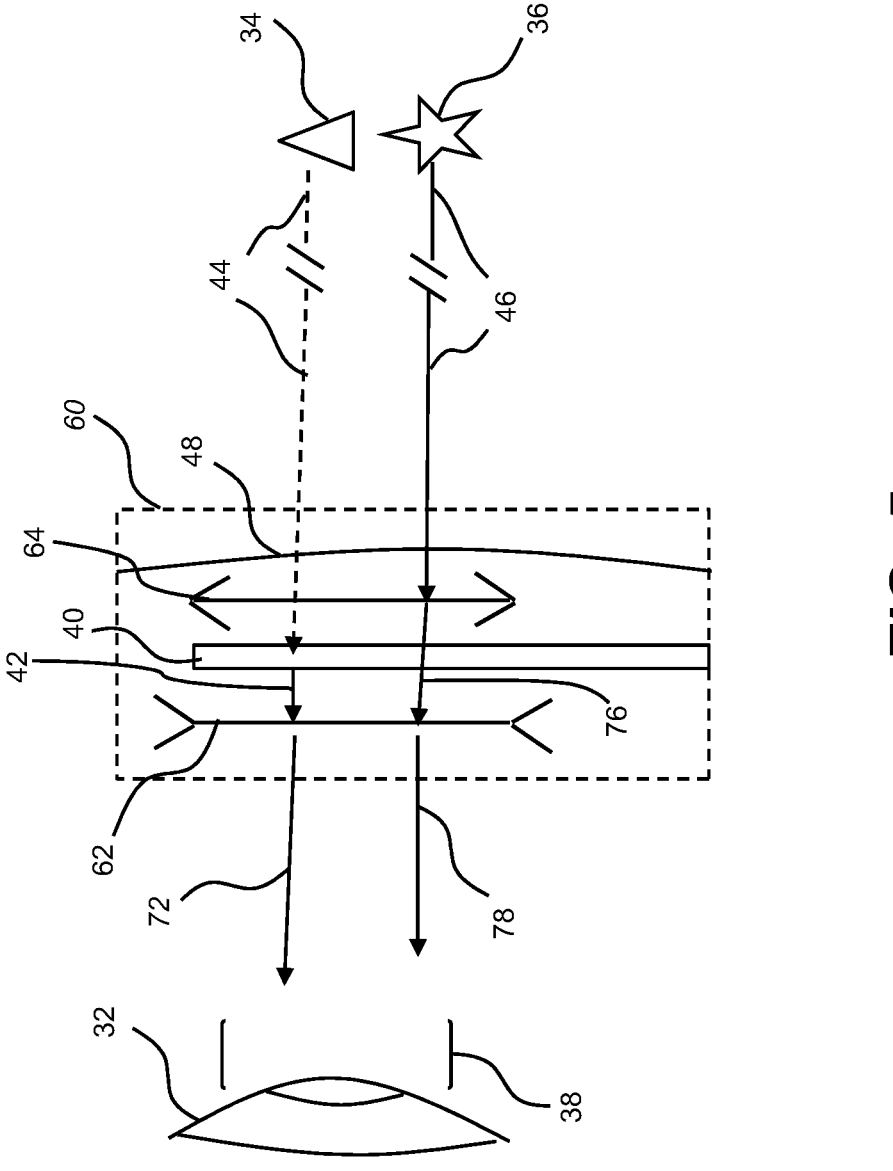
FIG. 5 is a schematic top view of an eye rim section of an HMD based on the eye rim section of FIG. 3 and adding both a negative-power optic and a positive-power optic.

FIG. 5 is a schematic depiction of an eye rim section 60 of an HMD, which is adapted to allow virtual objects 34, which are generated by a virtual image display system at a hyperfocal to near infinite focusing distance, to appear much closer. For example, in situations where the wearer of an HMD normally views real-world objects within a range requiring a given eye accommodation, virtual objects within the same scene at significantly greater focusing distances can be more difficult to perceive by requiring a significantly less eye accommodation. The wearer of the HMD can experience eye strain switching between the different amounts of accommodation required for viewing the virtual and real-world objects (e.g., between little or no accommodation and a perceptible accommodation involving a noticeable change in eye focal length).

The eye rim section 60 includes a negative-power or diverging optic 62 acting on the image-bearing light beams 42 emitted from the image light guide 40 for converting the image-bearing light beams 42 into diverging image-bearing light beams 72 having the effect that the virtual objects 34 with an apparent focus position traced by the virtual image-bearing light beams 44 appear closer. However, similarly shortening the focusing distance to the real-world objects 36 would not solve the problem of divergent focusing distances between the virtual and real-world objects 34 and 36. In addition, the real-world objects 36 would not appear in their true positions within the ambient environment.

To restore the desired real-world view through the eye rim section 60, the eye rim section 60 also includes a positive-power or converging optic 64 located between the image light guide 40 and the transmissive protective outer cover 48. In contrast to the negative-power optic 62, which effects the view of both the virtual and real-world objects 34 and 36, the positive-power optic 64 only affects the view of the real-world objects 36. The light beams 46 from the real-world object 46 are first converged into light beams 76 by the positive-power optic 64 and then diverged by the negative-power optic 62 into light beams 78 at which the original configuration of the light beams 46 is restored.

The positive-power optic 64 can be defined to have the same magnitude (i.e., absolute value) of optical power but of the opposite sign as the optical power of the negative-power optic 62. For example, the optical power of the positive power optic 64 may be denoted as +nD for a positive n-diopter optical power. The optical power of the negative-power optic 62 may be denoted as −mD for a negative m-diopter optical power. Acting on the light beams 46 from the real-world objects 36, the two optics 62 and 64 have a combined optical power of (n−m)D. Where "n" and "m" are set equal, the combined optical power may be zero. That is, (n−m)D=0D diopters. Although the effect of the negative-power optic 62 can be cancelled for viewing the real-object 36, the negative-power optic 62 retains the power to view the virtual objects 34 at a closer distance.

Preferably, the waveguide of the image light guide 40 does not impart any significant optical power that would significantly alter focus distances to the real-world objects 36. For example, to avoid imparting any refractive power, the one or more transmissive waveguides can be formed with planar surfaces within the viewing aperture of the eye rim section. In addition, the one or more out-coupling optics are preferably arranged to output the image-bearing light beams in a form that presents the virtual objects 34 at a hyperfocal to near infinite focusing distance.

In a refractive capacity, the negative-power optic 62 can be formed, for example, as a plano-concave lens, a biconcave lens, or negative meniscus lens, and the positive-power optic 64 can be formed, for example, as a plano-convex lens, a biconvex lens, or a positive meniscus lens. Alternative, one or both the negative-power and positive-power optics 62 and 64 can be formed as a holographic optical element (HOE). A convex outer surface of the positive-power optic 64 can replace the transmissive protective outer cover 48. Coatings can be applied to the convex outer surface for such purposes as filtering or other protection.

Figure 6:
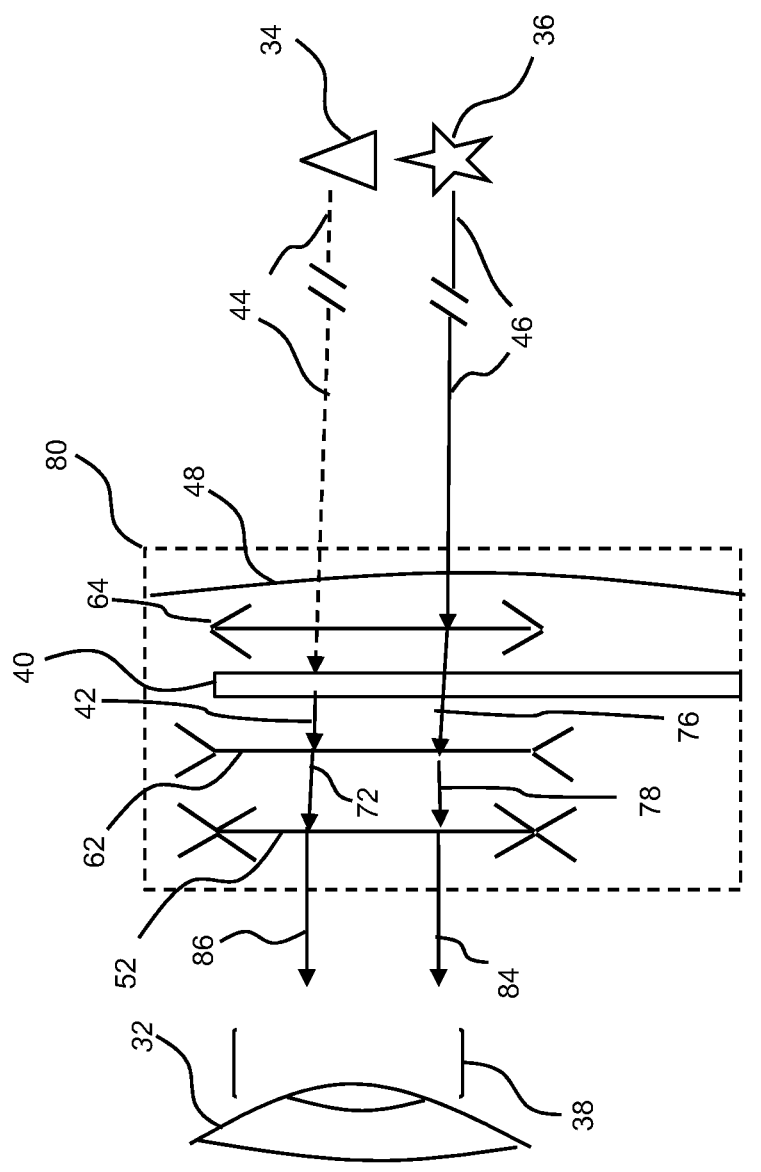
FIG. 6 is a schematic top view of an eye rim section of an HMD based on the eye rim section of FIG. 5 and adding the corrective optic of FIG. 4.

FIG. 6 is a schematic depiction of an eye rim section 80, which incorporates the features of the eye rim section 60 of FIG. 5, including the self-cancelling negative-power and positive-power optics 62 and 64 while also incorporating the corrective optic 52 of FIG. 4. The negative-power optic 62 moves the focusing distance of the virtual objects 34 closer to the wearer's eye 32, and the positive-power optic 64 cancels this effect for the real-world objects 36 visible through the eye rim section 80. The replaceable and customizable corrective optic 52, which is located between the negative-power optic 62 and the wearer's eye 32, provides a desired optical correction, such as may be estimated by an optical prescription, for normalizing the wearer's vision, such as long-distance vision. Other types of aberrations as described above for the corrective optic 52 can also be corrected.

The corrective optic 52 reorients or otherwise rearranges the restored light beams 78 into the light beams 84 so that the wearer's eye 32 can more clearly focus the real-world objects 36 without significant aberrations. In addition, the corrective optic 52 reorients or otherwise rearranges the image-bearing light beams 72 by which the virtual objects 34 appear at a closer focusing distance into the image-bearing light beams 86 so that the wearer's eye 32 can more clearly focus the closer-distance virtual objects 34 without significant aberrations.

The corrective optic 52, like the negative-power and positive-power optics 62 and 64, can be formed as a refractive lens, a diffraction grating, a holographic optical element (HOE) or a combination thereof. The negative-power optic 62 and the corrective optic 52 can also be combined into a single optical element in a refractive or diffractive form or combination thereof. As such, the single optical element performing the functions of the corrective optic 52 and the negative-power optic 62 is preferably attachable to and detachable from the eye rim section 80. The positive-power optic 64, particularly when having a convex outer surface, can replace the transmissive protective outer cover 48. Coatings can be applied to the convex outer surface for such purposes as filtering or other protection.

Preferably, optical power for influencing views of the real-world objects 36 is provided by the corrective optic 52 in combination with the self-cancelling effects of the negative-power optic 62 and the positive-power optic 64 rather than from the image light guide 40. Construction of the image light guide can be simplified by conveying each of the image bearing light beams in a substantially collimated form that presents the virtual objects 34 at a hyperfocal to near infinite focusing distance. The negative-power optic 62 can be arranged together with the corrective optic 52 to shorten the focusing distance at which virtual objects 34 are presented among the real-world objects 36 to the wearer's eye 32.

Figure 7:
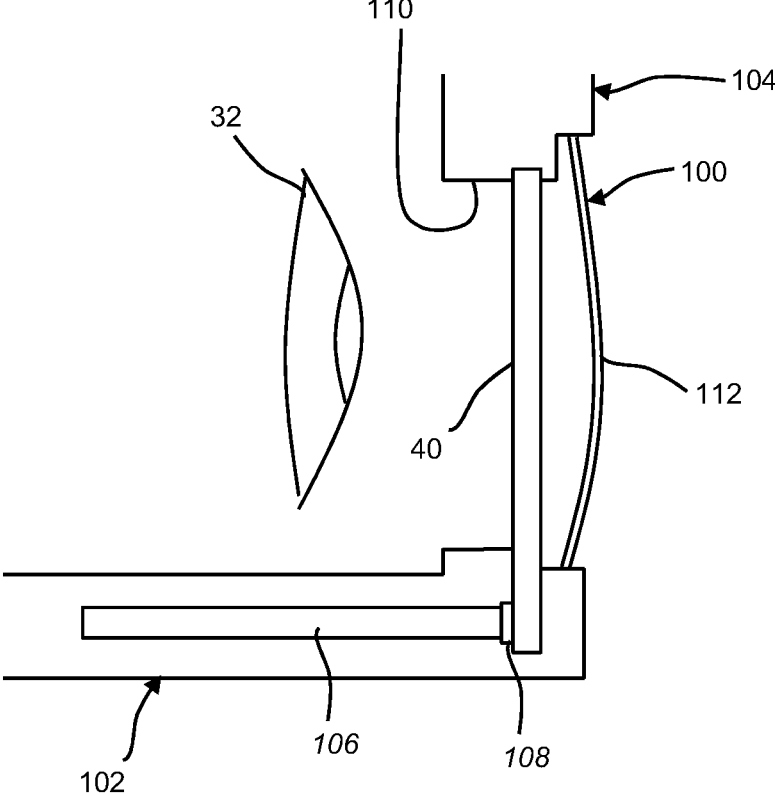
FIG. 7 is a top sectional view of an eye rim section containing and outer protective cover and an image light guide together with a right temple portion and a nose bridge portion of an HMD arranged for an augmented reality application according to an embodiment of the present disclosure.

FIG. 7 is a top view of an eye rim section 100 together with a right temple portion 102 and a nose bridge portion 104 of an HMD as intended to be oriented with respect to a wearer's eye 32. The eye rim section 100 merges with a nose bridge portion 104 of the HMD at an inner end and with the right temple portion 102 at an outer end.

An image light guide 40, such as previously described, provides for conveying virtual images to a wearer's eye 32 while providing a real-world view through the image light guide 40. The image light guide 40 is secured within the eye rim section 100 but receives its image-bearing light beams from a projector 106 as an image source mounted in the right temple portion 102 and through a coupling mechanism 108 that includes an in-coupling optic as described above.

The eye rim section 100 also defines an aperture 110 that is covered or at least substantially covered by a transmissive protective outer cover 112, which can be made removable and replaceable. Although the image light guide 40 is depicted with a single transparent planar waveguide, the eye rim section 100 can be arranged to accommodate multiple planar waveguides such as in a stacked (overlapping) configuration.

Figure 8:
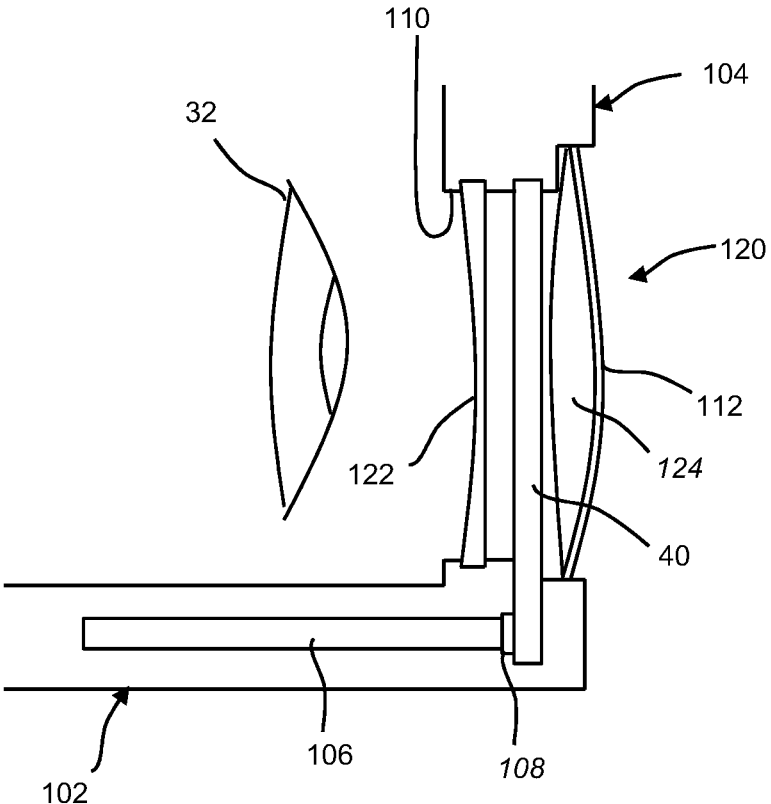
FIG. 8 is a top sectional view of an eye rim section containing an image light guide together with a right temple portion and a nose bridge portion of an HMD based on the HMD of FIG. 7 and adding both a negative-power optic and a positive-power optic.

FIG. 8 is a top view of an eye rim section 120 together with a right temple portion 102 and a nose bridge portion 104 of an HMD like the HMD of FIG. 7. The right temple portion 102 includes the same projector 106 and coupling mechanism 108 as used in FIG. 7 to direct angularly related image-bearing light beams into the planar waveguide of the image light guide 40. Also like the eye rim section 100 of FIG. 7, the eye rim section 120 includes the transmissive protective outer cover 112, which can be made attachable to or detachable from the remaining eye rim section 120.

The eye rim section 120 also includes both a negative-power optic 122 and a positive-power optic 124 like the eye rim section 60 of FIG. 5. The negative-power optic 122 converts the image-bearing light beams emitted from the image-bearing light guide 40 at a hyperfocal to near infinite focusing distance into diverging image-bearing light beams by which the virtual objects appear closer to the wearer's eye 32. The positive-power optic 124 counteracts the effects of the negative-power optic on light beams passing through the aperture 110 from the ambient environment so that the wearer sees real-world objects in their actual positions. Like the eye rim section 60 of FIG. 5, a convex surface of the positive-power optic 124 with appropriate coatings can be used in place of the transmissive protective outer cover 112.

Figure 9:
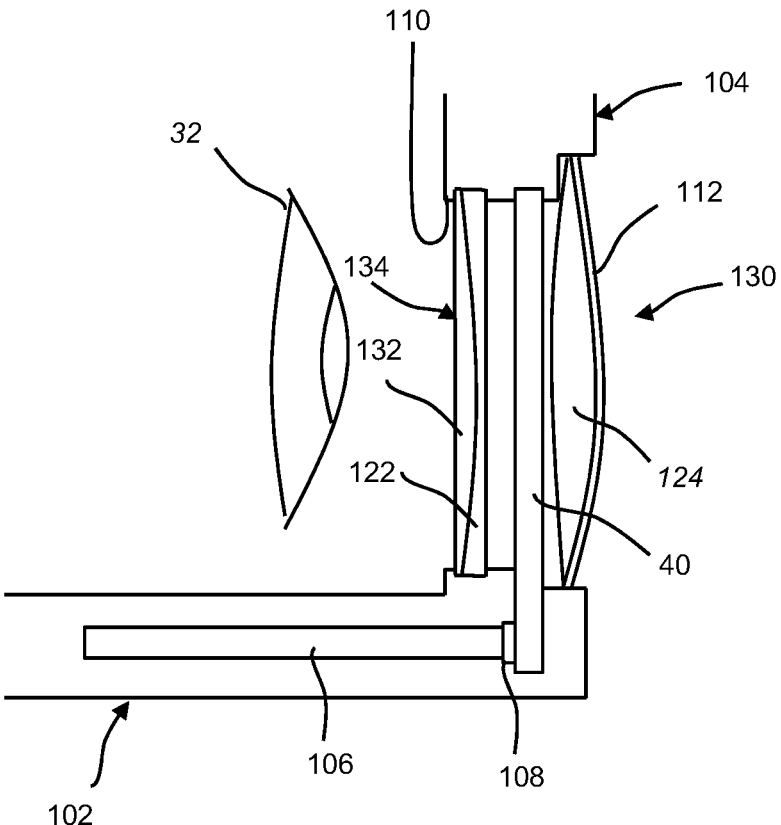
FIG. 9 is a top sectional view of an eye rim section containing an image light guide together with a right temple portion and a nose bridge portion of an HMD based on the HMD of FIG. 8 and adding a corrective optic.

FIG. 9 is a top view of an eye rim section 130 together with a right temple portion 102 and a nose bridge portion 104 of an HMD incorporating all the features of the eye rim section 120 and the corresponding right temple and nose bridge portions 102 and 104 of FIG. 8. However, like the eye rim section 80 of FIG. 6, the eye rim section 130 includes a replaceable and customizable corrective optic 132, which is located between the negative-power optic 122 and the wearer's eye 32.

Like the corrective optic 52 of FIG. 6, the corrective optic 132 enables the wearer to more clearly focus real-world objects that are visible through the aperture 110 as well as to more clearly focus virtual objects generated by the projector, conveyed by the image light guide 40, and presented at a closer focusing distance to the wearer's eye 32 by the negative-power optic 122.

As described above, the corrective optic 132, like the negative-power and positive-power optics 122 and 124, can be formed as a refractive lens, a diffraction grating, a holographic optical element (HOE) or a combination thereof. The negative-power optic 122 and the corrective optic 132 can also be combined into a single optical element shown in the form of a lens doublet 134. Other refractive or diffractive forms or combinations thereof could also be used as the considered single element. The lens doublet 134 or another form of a single optical element performing the functions of the corrective optic 132 and the negative-power lens 122 is preferably attachable to and detachable from the remaining eye rim section 130. As also described above, a properly treated convex outer surface of the positive-power optic 124 can replace the transmissive protective outer cover 112.

As an example in which the corrective optic 132 is combined with the negative-power optic 122 in a compound optical element, such as the lens doublet 134, assume that the positive-power optic 122 furthest from the wearer's eye 32 contributes +1 diopters of optical power. Assuming further that the wearer requires a prescribed correction of −2 diopters of optical power for a correction at the desired viewing distance, then the compound optical element, such as the lens doublet 134, can be arranged to contribute −3 diopters of optical power. The −3 diopters of optical power compensates for the +1 diopters of optical power otherwise affecting the view of real-world objects, preserves the −1 diopters of optical power required to present the generated virtual objects at a closer focusing distance, and corrects the wearer's vision of both the real-world and virtual objects at the desired viewing distance. In a more general sense the optical power "c" of the prescription minus the optical power "p" of the positive-power optic 124 equals the optical power "s" of the compound optical element, such as the lens doublet 134, (i.e., s=c−p) to achieve these results.

Figure 10:
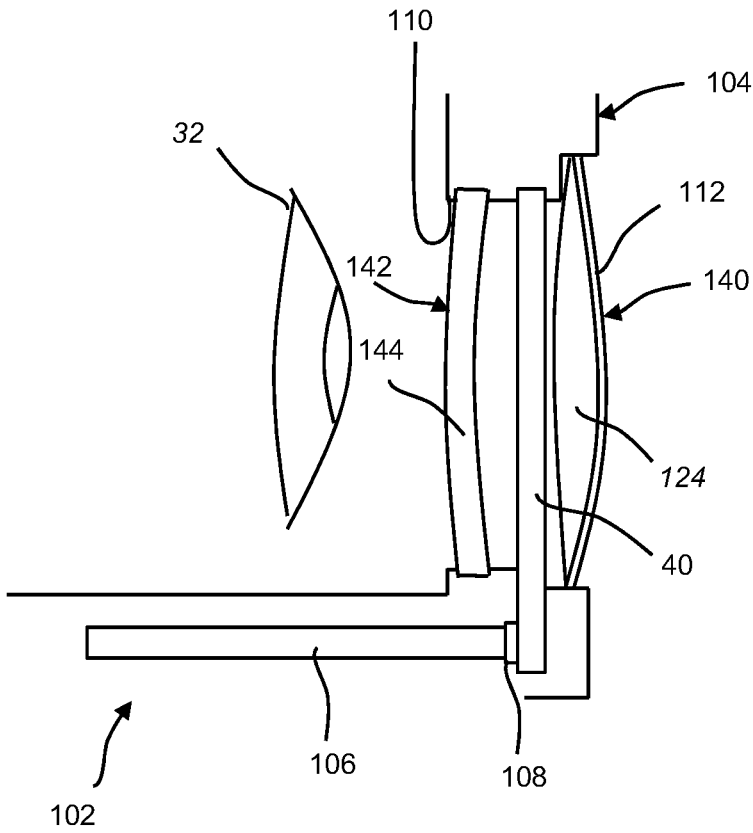
FIG. 10 is a top sectional view of an eye rim section containing an image light guide together with a right temple portion and a nose bridge portion of an HMD based on the HMD of FIG. 9 but replacing both the negative-power optic and the corrective optic with multifunction optic for performing both functions in a single optical element.

FIG. 10 is a top view of an eye rim section 140 similar to the eye rim section 130 of FIG. 9 where like numbers refer to like elements. In the eye rim section 140, however, the lens doublet 134 as an example of a compound optic is replaced by a multifunction optic 142 in the form of a simple lens 144 as an example of a single optical element for performing the functions of both the negative-power optic 122 and the corrective optic 132. The multifunction optic 142 as a single optical element can be formed as a refractive lens, a diffraction grating, a holographic optical element (HOE) or a combination thereof.

The multifunction optic 142 is both replaceable and customizable to accommodate different optical prescriptions of the wearer's eye 32 for reducing the wearer's optical aberrations associated with viewing virtual objects at the closer focusing distance provided by the negative power that is also incorporated into the multifunction optic 142. In addition, the multifunction optic 142 can be customizable to also change the amount of negative power that is incorporated into the multifunction optic 142 to alter the focusing distance at which the virtual objects are presented to the wearer's eye. Preferably, the corrective contribution of the multifunction optic 142 is set to reduce the wearer's optical aberrations associated with viewing both real-world objects and virtual objects at the altered focusing distance. In addition, any change in the negative power of the multifunction optic 142 is preferably matched by a corresponding change in the positive power of the positive-power optic 124, which is made similarly replaceable and customizable to counteract the effects of the negative power contributed by the multifunction optic 142 on light beams passing through the aperture 110 from the ambient environment so that the wearer sees real-world objects in their actual positions.

Figure 11A:
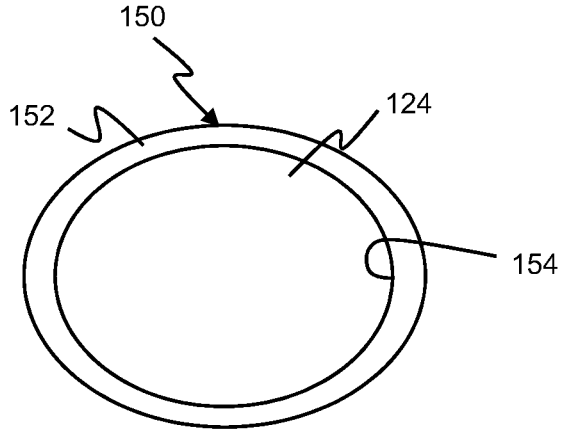
FIG. 11A is a front view of a replacement module for housing both the positive-power optic and the multifunction optic in a fashion for replacing one set of optics with another set of optics within the eye rim section of an HMD according to an embodiment of the present disclosure.

FIG. 11A-11D feature a compound lens holder 150 that provides for supporting and collectively replacing the both the positive-power optic 124 and the multifunction optic 142 within a receptive eye rim section 160 of an HMD. In FIG. 11A, the compound lens holder 150 is shown with a rim-like housing 152 defining an aperture 154 for sustaining a clear view of the ambient environment through the supported positive-power optic 124 and the multifunction optic 142.

Figure 11B:
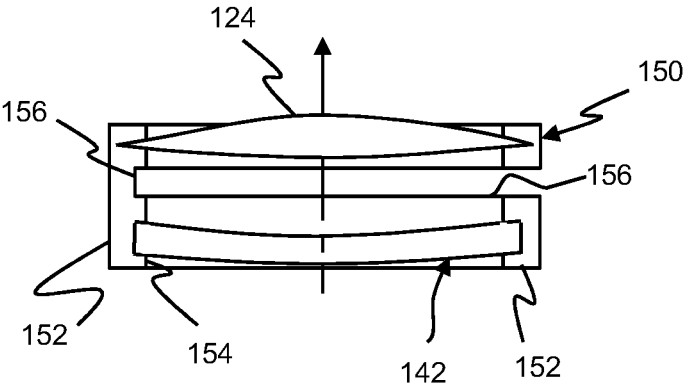
FIG. 11B is a top sectional view of the replacement module showing the positive-power optic and the multifunction optic mounted within a common lens housing according to an embodiment of the present disclosure.

In the top sectional view of FIG. 11B, the housing 152 engages the outer peripheries of the positive-power optic 124 and the multifunction optic 142 to maintain a desired optical alignment between the two optics 124 and 142. Housing 152 further comprises a slot 156 providing clearance for accommodating an image light guide such as the image light guide 40 shown in FIG. 11C that is more permanently installed in the depicted eye rim section 160 of the HMD.

Figure 11C:
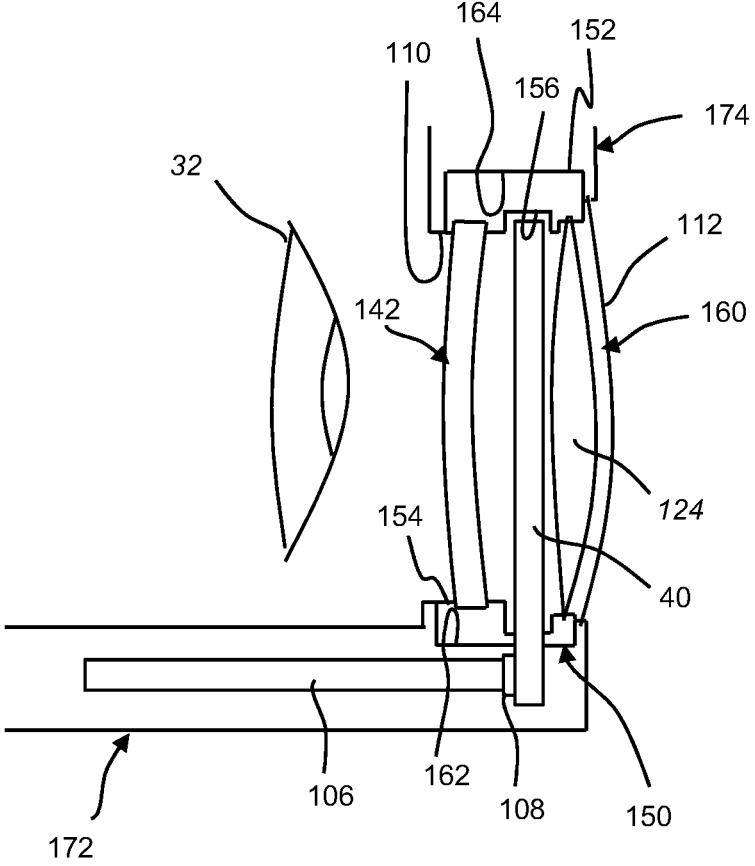
FIG. 11C is a top sectional view of an eye rim section containing an image light guide with the replacement module slideably mounted between a right temple portion and a nose bridge portion of an HMD according to an embodiment of the present disclosure.

Similar to the preceding figures, the HMD as shown in the top sectional view of FIG. 11C includes a right temple portion 172 and a nose bridge portion 174. Projector 106 and coupling mechanism 108 in the right temple portion 172 deliver image-bearing beams into the image light guide 40, which is also supported in the right temple portion 172. However, both the right temple portion 172 and the nose bridge portion 174 are adapted with respective slots 162 and 164 to slideably receive the compound lens holder 150 in a fashion that aligns the aperture 154 of the compound lens holder 150 with the aperture 110 of the eye rim section 160 for similarly accommodating the passage of light from both the ambient environment and the image light guide 40 toward the wearer's eye 32. Preferably, the compound lens holder 150 together with the positive-power optic 124 and the multifunction optic 142 can be slid into place between the right temple portion 172 and the nose bridge portion 174 without disturbing the prepositioning of the image light guide 40 within the eye rim section 160. The slot 156 preferably provides clearance for this purpose.

Figure 11D:
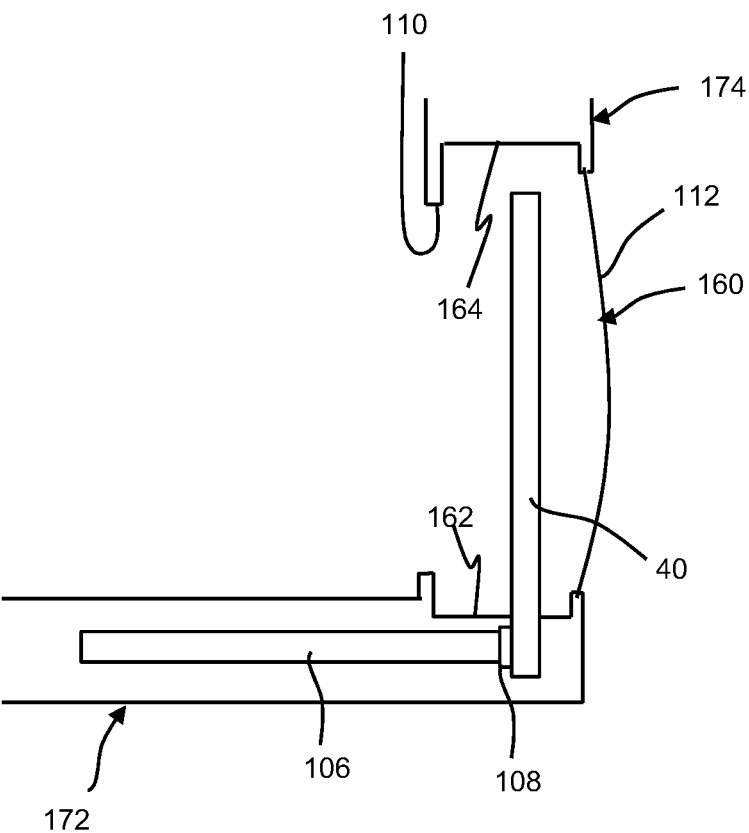
FIG. 11D is a top sectional view of the HMD of FIG. 11C with the replacement module removed.

FIG. 11D is a top sectional view of the eye rim section 160 containing an image light guide 40 with the compound lens holder 150 removed. Here, the respective slots 162 and 164 in the right temple portion 172 and the nose bridge portion 174 are more clearly visible for receiving the compound lens holder 150 within the eye rim section 160. The compound lens holder 150 containing customized positive-power and multifunction optics 124 and 142 can be fastened to eye rim section 160 in a variety of ways such as by using a set screw (not shown) into right temple and/or nose bridge portions 102 and 104 or a flexible rubber gasket (not shown).

Multiple compound lens holders 150 can be prearranged with customized combinations of the positive-power and multifunction optics 124 and 142 that can be replaceably positioned within the eye rim section 160. Customizable positive-power and multifunction optics 124 and 142 can also be removably replaceable within individual compound lens holders 150.

Although the figures illustrate only a portion of an HMD with an eye rim section for just one eye as may be appropriate for a monocular HMD, a second eye rim section in a symmetrical arrangement can be included for a wearer's other eye as a part of a full HMD device for providing binocular or stereoscopic views of both virtual and real-world objects within the wearer's field of view.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. A head-mounted display, comprising:

a temple;

an eye rim section having an aperture, wherein the eye rim section is coupled with the temple, and wherein a real-world object within an ambient environment is viewable through the aperture;

a nose bridge coupled with the eye rim section;

an image light guide fixedly arranged at least partially within the aperture of the eye rim section, the image light guide including:

a transmissive planar waveguide having plane-parallel inner and outer surfaces, an in-coupling optic operable to direct angularly related image-bearing light beams encoding a virtual object into the waveguide from an image source, wherein the image-bearing light beams propagate by total internal reflection, and an out-coupling optic comprising a diffraction grating configured to expand at least one dimension of an eyebox and operable to direct the propagating image-bearing light beams from the waveguide toward the eyebox, wherein the virtual object is viewed at a first focusing distance from the eyebox;

a multifunction optic arranged at least partially within the aperture between the inner surface of the waveguide and the eyebox, wherein the multifunction optic is formed as a single optical element operable to provide:

(a) a negative optical power contribution operable to diverge the image-bearing light beams in advance of the eyebox, wherein the virtual object is operable to be viewed at a second focusing distance from the eyebox and the second focusing distance is closer than the first focusing distance, and (b) a corrective optical contribution operable to reduce optical aberrations associated with viewing both the real-world object and the virtual object at the second focusing distance, wherein the corrective optical contribution includes a cylindrical optical power contribution; and a positive-power optic arranged at least partially within the aperture between the outer surface of the waveguide and the ambient environment, wherein the positive-power optic is operable to compensate for the negative optical power contribution of the multifunction optic without compensating for the corrective optical contribution of the multifunction optic, wherein the real-world object is viewed at its actual distance from the eyebox with corrected vision;

a removable lens-holder configured to support the multifunction optic and the positive-power optic at least partially within the aperture of the eye rim section, wherein the lens-holder comprises a housing configured to engage an outer periphery of the multifunction optic and an outer periphery of the positive-power optic, and a slot configured to accommodate the image light guide at least partially between the positive-power optic and the multifunction optic, wherein the lens-holder is slideably removeable from the eye rim section and the image light guide, wherein the temple and the nose bridge each comprise a slot configured to slideably receive the lens holder via a friction fit.

2. The head-mounted display of claim 1, wherein the multifunction optic is a single refractive lens element.

3. The head-mounted display of claim 1, wherein the first focusing distance is a hyperfocal to near infinite distance and the closer second focusing distance is between 0.05 meters and 1.50 meters.

4. The head-mounted display of claim 1, wherein the multifunction optic is a first of a plurality of multifunction optics, and the first multifunction optic is removable and replaceable with a second of the multifunction optics to adapt the display to a different optical prescription, wherein the lens-holder is slideably removeable from the head-mounted display.

5. The head-mounted display of claim 1, wherein the multifunction optic is a first of a plurality of multifunction optics, the positive-power optic is a first of a plurality of positive-power optics, and the first multifunction optic and the first positive-power optic are collectively removable and replaceable with a second of the multifunction optics and a second of the positive-power optics for changing the closer second focusing distance to a different third focusing distance.

6. The head-mounted display of claim 1, further comprising a transmissive protective outer cover arranged at least partially within the aperture between the positive-power optic and the ambient environment.

7. The head-mounted display of claim 1, wherein the positive-power optic is a lens having a convex outer surface facing the ambient environment and is treated with a protective coating.

8. The head-mounted display of claim 1, wherein the image light guide is in fixed arrangement at least partially within the aperture.

9. An augmented reality virtual image display system for managing a viewer's view of a virtual object and a real-world object within a common field of view, comprising:

a temple;

an eye rim section having an aperture, wherein the eye rim section is coupled with the temple; and a nose bridge coupled with the eye rim section;

an image light guide including inner and outer surfaces fixedly arranged at least partially within the aperture of the eye rim section, comprising:

an in-coupling optic operable to direct angularly related image-bearing light beams encoding a virtual object into the waveguide from an image source, wherein the image-bearing light beams propagate by total internal reflection, and an out-coupling optic comprising a diffraction grating configured to expand at least one dimension of an eyebox, wherein the image light guide is operable to direct angularly related image-bearing light beams encoding the virtual object toward the eyebox, wherein the virtual object is viewed at a first focusing distance from the eyebox;

a multifunction optic located between the inner surface of the image light guide and the eyebox, wherein the multifunction optic is formed as a single optical element operable to provide:

(a) a negative optical power contribution operable to diverge the image-bearing light beams in advance of the eyebox, wherein the virtual object is viewed at a second focusing distance from the eyebox and the second focusing distance is closer than the first focusing distance, and (b) a corrective optical contribution operable to reduce optical aberrations associated with viewing of both the real-world object and the virtual object at the second focusing distance, wherein the corrective optical contribution includes a cylindrical optical power contribution; and a positive-power optic arranged adjacent to the outer surface of the image light guide, wherein the positive-power optic is operable to compensate for the negative optical power contribution of the multifunction optic without compensating for the corrective optical contribution of the multifunction optic, wherein the real-world object is viewed at its actual distance from the eyebox with corrected vision;

a lens-holder configured to support the multifunction optic and the positive-power optic at least partially within the aperture of the eye rim section, wherein the lens-holder comprises a housing engaged with an outer periphery of the multifunction optic and an outer periphery of the positive-power optic, wherein the lens-holder is slideably removeable from the augmented reality virtual image display system and the image light guide, and wherein the lens-holder comprises a slot configured to accommodate the image light guide at least partially between the positive-power optic and the multifunction optic, wherein the temple and the nose bridge each comprise a slot configured to slideably receive the lens holder via a friction fit.

10. The augmented reality virtual image display system of claim 9, wherein the multifunction optic is a single refractive lens element.

11. The augmented reality virtual image display system of claim 9, wherein the first focusing distance is a hyperfocal to near infinite distance and the closer second focusing distance is less than the hyperfocal distance.

12. The augmented reality virtual image display system of claim 11, wherein the closer second focusing distance is between 1.5 meters and 4 meters.

13. The augmented reality virtual image display system of claim 11, wherein the closer second focusing distance is between .05 meters and 1.5 meters.

14. The augmented reality virtual image display system of claim 11, wherein the corrective optical contribution is set for reducing the optical aberrations at the closer second focusing distance.

15. The augmented reality virtual image display system of claim 9, wherein the multifunction optic is a first of a plurality of multifunction optics, and the first multifunction optic is removable and replaceable with a second of the multifunction optics to adapt the display system to a different optical prescription.

16. The augmented reality virtual image display system of claim 15, wherein a negative-power contribution of the second multifunction optic is the same as the negative power contribution of the first multifunction optic, and a corrective optical contribution of the second multifunction optic is different from the corrective optical contribution of the first multifunction optic.

17. The augmented reality virtual image display system of claim 9, wherein the multifunction optic is a first of a plurality of multifunction optics, the positive-power optic is a first of a plurality of positive-power optics, and the first multifunction optic and the first positive-power optic are collectively removable and replaceable with a second of the multifunction optics and a second of the positive-power optics for changing the closer second focusing distance to a different third focusing distance.

18. The augmented reality virtual image display system of claim 17, wherein the second multifunction optic provides a corrective optical contribution to reduce the optical aberrations at the different third focusing distance.

19. The augmented reality virtual image display system of claim 9, further comprising a transmissive protective outer cover located between the positive-power optic and an ambient environment from which the real-world object is viewed.

20. The augmented reality virtual image display system of claim 9, wherein the positive-power optic is a lens having a convex outer surface that faces an ambient environment from which the real-world object is viewed and that is treated with a protective coating.

21. The augmented reality virtual image display system of claim 9, wherein the image light guide includes a transmissive planar waveguide having plane-parallel inner and outer surfaces, an in-coupling optic for directing the angularly related image-bearing light beams into the waveguide from an image source for propagation by internal reflection from the inner and outer surfaces, and an out-coupling optic for directing the propagating image-bearing light beams from the waveguide toward the eyebox; wherein the image light guide is in fixed arrangement with the head-mounted display.

22. The augmented reality virtual image display system of claim 9, further comprising a gasket configured to secure the lens holder to the eye rim section.

23. The augmented reality virtual image display system of claim 9, wherein the lens holder is operable to slide in a plane substantially parallel with the inner and outer surfaces of the image light guide.

\* \* \* \* \*